United States Patent [19]

Flores

[11] Patent Number: 4,683,025
[45] Date of Patent: Jul. 28, 1987

[54] METHOD AND APPARATUS TO CONVERT A LONG TUBE VERTICAL EVAPORATOR TO A FALLING FILM EVAPORATOR

[75] Inventor: A. Roland Flores, Mountainside, N.J.

[73] Assignee: The Graver Company, Union, N.J.

[21] Appl. No.: 828,226

[22] Filed: Feb. 10, 1986

[51] Int. Cl.$^4$ .......................... B01D 1/22; B01D 3/06
[52] U.S. Cl. .......................................... 159/2.1; 159/3;
159/5; 159/13.1; 159/43.1; 159/48.1; 159/49;
159/DIG. 2; 202/235; 202/236; 202/254;
203/88; 203/89; 203/90; 165/115
[58] Field of Search ................ 159/2.1, 3, 49, 5, 13.1,
159/43.1, DIG. 40, 48.1, DIG. 2; 202/236, 235,
254; 203/89, 99, 98, 88; 165/115

[56] References Cited

U.S. PATENT DOCUMENTS

| | | | |
|---|---|---|---|
| 1,060,607 | 5/1913 | Kestner | 159/17.1 |
| 1,717,927 | 6/1929 | Hughes et al. | 159/13.2 |
| 1,776,483 | 9/1930 | White | 165/118 |
| 2,076,597 | 4/1937 | Robinson et al. | 159/47.1 |
| 2,117,337 | 5/1938 | Lobl et al. | 159/27.1 |
| 2,696,248 | 12/1954 | Diamond | 159/13.1 |
| 2,993,844 | 7/1961 | Nilan | 202/235 |
| 3,211,633 | 10/1965 | Hammer et al. | 202/236 |
| 3,242,970 | 3/1966 | Schmole | 159/17.1 |
| 3,332,469 | 7/1967 | Rosenblad | 165/115 |
| 3,469,615 | 9/1969 | Usher | 159/13.1 |
| 3,486,548 | 12/1969 | Todd | 159/5 |
| 3,504,738 | 4/1970 | McGuffey | 165/117 |
| 3,759,308 | 9/1973 | Gebauer | 159/13.1 |
| 3,893,893 | 7/1975 | Miserlis et al. | 202/174 |
| 3,915,712 | 10/1975 | Herzhoff et al. | 202/236 |
| 4,094,734 | 6/1978 | Henderson | 159/49 |
| 4,154,642 | 5/1979 | Mattern et al. | 159/13.2 |
| 4,259,252 | 3/1981 | Perry et al. | 202/174 |
| 4,287,019 | 9/1981 | Standiford | 159/6.1 |
| 4,294,652 | 10/1981 | Newman | 159/2.1 |
| 4,349,068 | 9/1982 | Coury | 165/917 |

FOREIGN PATENT DOCUMENTS 0392948 12/1973 U.S.S.R. ............................ 159/13.1

Primary Examiner—S. Leon Bashore
Assistant Examiner—V. Manoharan
Attorney, Agent, or Firm—Dressler, Goldsmith, Shore, Sutker & Milnamow, Ltd.

[57] ABSTRACT

A method and apparatus for converting a long tube vertical evaporator to a falling film evaporator in a manner which permits salvaging most of the long tube vertical evaporator structure. The bottom chamber of the existing evaporator is extended to define a flash chamber intermediate the existing heat exchanger chamber and the bottom chamber. A vapor riser conduit is provided for directing vapor from the flash chamber to the vapor separation chamber positioned above the heat exchanger chamber. A recirculation conduit is provided for directing liquid from the bottom chamber therethrough into a distribution chamber which is provided above and in communication with the upper ends of the heat exchange tubes positioned in the heat exchanger chamber. The distribution chamber is preferably provided with a plurality of spray nozzles which communicate with the recirculation conduit to evenly distribute a film of liquid downwardly through the heat exchange tubes.

10 Claims, 2 Drawing Figures 4,683,025

METHOD AND APPARATUS TO CONVERT A LONG TUBE VERTICAL EVAPORATOR TO A FALLING FILM EVAPORATOR

BACKGROUND OF THE INVENTION

The present invention is directed to a method and apparatus for converting long tube vertical evaporators to falling film evaporators.

Long tube vertical evaporators (LTV) have heretofore been widely used, particularly in the pulp and paper industry. Such evaporators typically include a heat exchange chamber disposed between a bottom chamber and a vapor separation chamber. The heat exchanger chamber has a plurality of heat exchange tubes positioned therein which vertically extend between an upper tube sheet and a lower tube sheet. The bottom chamber extends below the heat exchanger chamber in fluid communication with the lower ends of the heat exchange tubes. The vapor separation chamber extends around and above an upper portion of the heat exchanger chamber in fluid communication with the upper ends of the heat exchange tubes. Feed liquid to be treated enters the bottom chamber through a feed inlet associated therewith and is directed upwardly through the heat exchange tubes. A vapor, such as steam, is directed into the heat exchanger chamber through a vapor inlet associated therewith, which causes at least a portion of the liquid passing through the heat exchange tubes to vaporize as it passes upwardly therethrough. A mixture of vapor and liquid passing through the upper ends of the heat exchange tubes is directed into the vapor separation chamber, wherein the vapor is separated from the liquid and is removed through a vapor outlet associated with an upper portion thereof and the liquid is removed through a product outlet associated with a lower portion thereof.

Falling film evaporators have heretofore been widely used in systems wherein the feed liquid is heat sensitive or requires low residence time and wherein low temperature differences exist. These evaporators typically have high heat transfer coefficients. Such evaporators typically include a heat exchanger chamber disposed between an upper distribution chamber and a vapor separation chamber. The heat exchanger chamber is of similar design as the heat exchanger chamber as discussed hereinabove with regards to the long tube vertical evaporator. The distribution chamber is positioned above the heat exchanger chamber in fluid communication with the upper ends of the heat exchange tubes positioned in the heat exchanger chamber. The vapor separation chamber extends below the heat exchanger section in fluid communication with the lower ends of the heat exchange tubes. Feed liquid to be treated enters the upper distribution chamber through a feed inlet associated therewith and is directed downwardly through the heat exchange tubes in the form of a vertical falling film. A vapor, such as steam, is directed into the heat exchanger chamber through a vapor inlet associated therewith, which causes at least a portion of the liquid passing through the heat exchange tubes to vaporize as it passes downwardly therethrough. A mixture of vapor and liquid passing through the lower ends of the heat exchange tubes is directed into the vapor separation chamber, wherein the vapor is separated from the liquid and is removed through a vapor outlet associated with an upper portion thereof and the liquid is removed through a product outlet associated with a lower portion thereof.

It is the latest thought in many industries, particularly in the pulp and paper industry, to utilize the falling film evaporator design. It has heretofore been necessary to scrap existing long tube vertical evaporators and purchase new falling film evaporators in order to convert over to the falling film type of evaporator. The present invention is specifically directed to a method and apparatus which permits such a conversion while salvaging a large portion of the existing apparatus.

SUMMARY OF THE INVENTION

In accordance with the method and the apparatus of the present invention, a long tube vertical evaporator is converted into a falling film evaporator in a manner which permits salvaging most of the structure of the existing long tube vertical evaporator. The bottom chamber of the existing evaporator is extended so as to define a flash chamber intermediate the heat exchanger chamber and the bottom chamber for receipt of feed liquid directly thereinto through the existing feed inlet. A vapor riser conduit is provided, having a first end in fluid communication with the flash chamber and a second end in fluid communication with the vapor separation chamber, for directing vapor from the flash chamber to the vapor separation chamber. A recirculation conduit is provided, having a first end in fluid communication with the bottom chamber and a second end in fluid communication with an upper portion of the heat exchanger chamber. Recirculation means, such as a recirculation pump, is provided for directing liquid from the bottom chamber through the recirculation conduit and distributing same over the upper ends of the heat exchange tubes. A distribution chamber is preferably provided above the heat exchange tubes for evenly distributing a film of liquid downwardly through the tubes. The distribution chamber is preferably provided with a plurality of spray nozzles in fluid communication with the second end of the recirculation conduit. In order to facilitate the conversion and to maximize the number of heat exchange tubes in the heat exchanger chamber, the vapor riser conduit and the recirculation conduit extend externally of the heat exchanger chamber. The product outlet associated with the vapor separation chamber is closed off and a new product outlet is provided in fluid communication with the bottom chamber.

Other features and advantages of the invention will be apparent from the detailed description of the invention and the claims which hereinbelow follow.

DETAILED DESCRIPTION OF THE INVENTION

Figure 1:
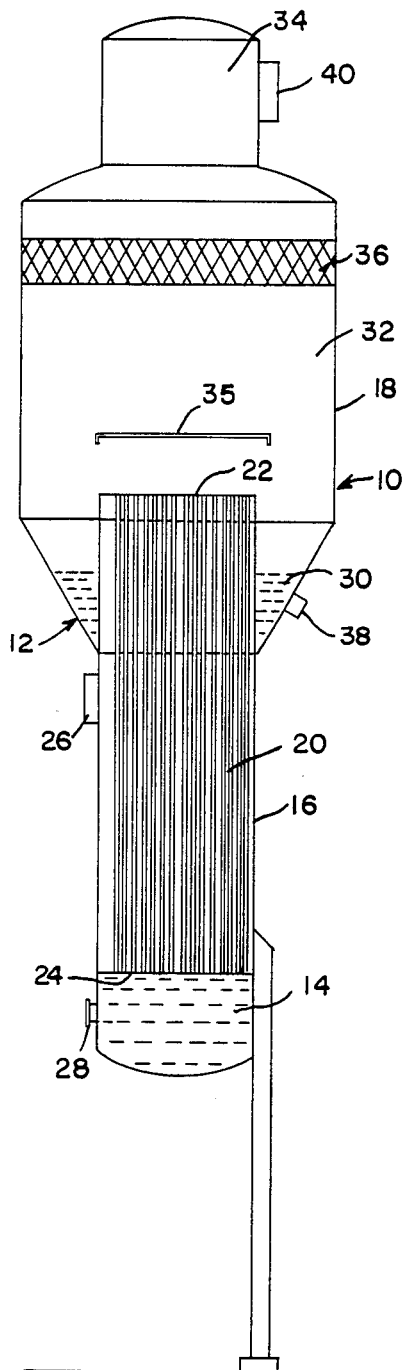
FIG. 1 is a schematic, cross sectional representation of a typically long tube vertical evaporator apparatus of the type in which the present invention is directed to convert to a falling film evaporator.

Referring to FIG. 1, a typical long tube vertical evaporator apparatus is indicated generally by the reference numeral 10. Evaporator 10 comprises an upstanding vessel 12 which defines a bottom chamber 14, a heat exchanger chamber 16, and a vapor separation chamber 18.

Heat exchanger chamber 16 has a plurality of spaced apart, vertical heat exchange tubes 20 which extend between an upper tube sheet 22 and a lower tube sheet 24. The upper ends of tubes 20 are in fluid communication with vapor separation chamber 18 through corresponding openings formed in tube sheet 22 and the lower ends of tubes 20 are in fluid communication with bottom chamber 14 through corresponding openings formed in tube sheet 24. A vapor, such as steam, is suitably directed into heat exchanger chamber 16 through a vapor inlet 26.

Bottom chamber 14 is separated from heat exchanger chamber 16 by tube sheet 24 and is in fluid communication with the lower ends of tubes 20. Feed liquid is directed into bottom chamber 14 through a feed inlet 28 and upwardly through tubes 20 in a heat exchange relationship with the steam within heat exchanger chamber 16. The steam which condenses in chamber 16 is suitably withdrawn therefrom through an outlet line (not shown).

Vapor separation chamber 18 is positioned around an upper portion of heat exchanger chamber 16 and extends upwardly therefrom. Chamber 18 is typically formed so as to define a lower product liquid receiving section 30 surrounding the upper portion of chamber 16, an intermediate separation section 32 and an upper vapor receiving section 34. A central baffle plate 35 is typically positioned in section 32 in facing relationship with the upper ends of tubes 20 to arrest unevaporated liquid droplets passing upwardly from tubes 20 to reduce entrainment thereof with the vapor passing upwardly into section 32. An entrainment separator 36, of well known construction, is typically provided across an upper portion of section 32 to further facilitate the separation of the unevaporated liquid from the rising vapor. The unevaporated liquid is collected in section 30 and removed therefrom through a product outlet 38. The vapor is collected in section 34 and removed therefrom through a vapor outlet 40.

Figure 2:
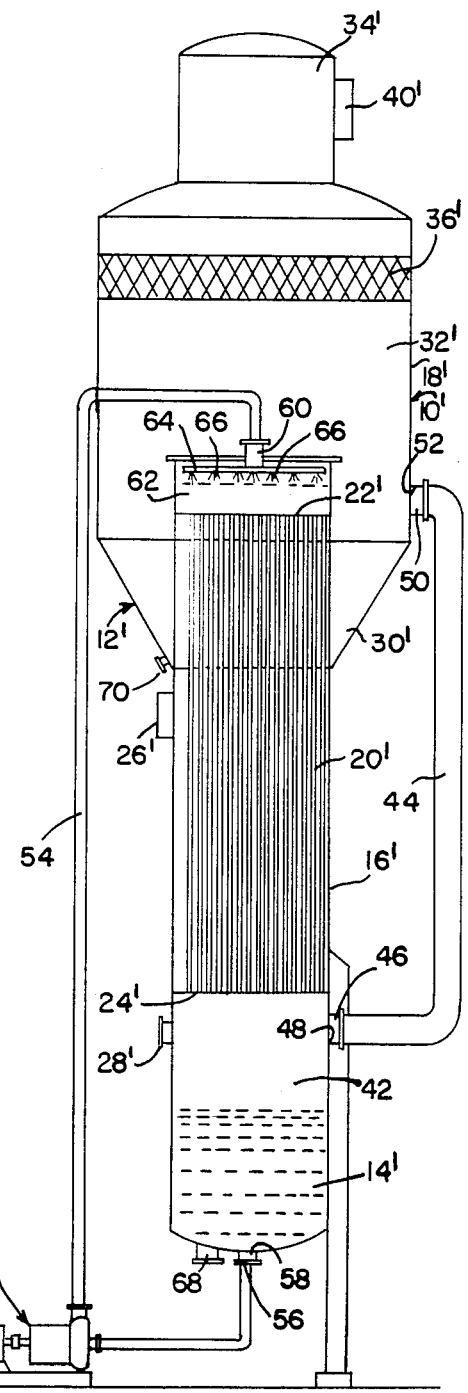
FIG. 2 is a schematic, cross sectional representation of the evaporator as shown in FIG. 1 after it has been converted to a falling film evaporator in accordance with the present invention.

Referring to FIG. 2, the long tube vertical evaporator apparatus 10 of FIG. 1 is shown as converted to a falling film evaporator apparatus 10', in accordance with the present invention. In order to facilitate the description of the method and apparatus of the invention, the structural elements of the apparatus shown in FIGS. 1 and 2 which are common are designated by the same reference numeral in FIG. 2 followed by a prime (') sign.

Vessel 12' is substantially identical to vessel 12 as described hereinabove with regards to FIG. 1, with the exception that the lower end of bottom chamber 14 is extended so as to define a bottom chamber 14' and a flash chamber 42. Flash chamber 42 is positioned intermediate bottom chamber 14' and heat exchanger chamber 16'. Feed inlet 28' is in fluid communication with flash chamber 42 and directs liquid to be treated directed thereinto.

A vapor riser conduit 44 is provided which extends between flash chamber 42 and vapor separation chamber 18'. Conduit 44 has a first end 46, which communicates with flash chamber 42 through an opening 48 formed in the outer wall thereof, and a second end 50, which communicates with vapor separation chamber 18' through an opening 52 formed in the outer wall thereof. As will hereinbelow become more apparent, vapor which is formed in chamber 42 is directed through conduit 44 into chamber 18'. Second end 46 preferably communicates with chamber 42 in a manner which directs vapor passing therethrough horizontally across a lower portion of section 32' of chamber 18' so as to avoid reentrainment of liquid droplets into the vapor rising in section 32'. Also, in accordance with the present invention, conduit 44 is preferably positioned exterior of heat exchanger chamber 16' so as to facilitate the conversion procedure and, more importantly, to maximize the number of heat exchange tubes 20' which may be provided in heat exchanger chamber 16'.

A recirculation conduit 54 is provided which extends between bottom chamber 14' and heat exchanger chamber 16'. Conduit 54 has a first end 56, which communicates with a bottom chamber 14' through an opening 58 formed in a bottom portion thereof, and a second end 60 which communicates with an upper portion of heat exchanger chamber 16'. Conduit 54 is provided with recirculation means, such as a recirculation pump assembly 61, interposed therein, for directing liquid from the bottom chamber 14' therethrough for distribution over the upper ends of the heat exchange tubes 20 in a manner which will hereinbelow be further described. For much the same reasons as with regards to conduit 44, conduit 54 is preferably positioned exterior of heat exchanger 16'.

In order to facilitate the even distribution of a falling film of liquid through heat exchange tubes 20, the baffle plate 35 is removed and a distribution chamber 62 is provided above tube sheet 22'. The second end 60 of conduit 54 extends through an opening in the top of chamber 62 and communicates with a distribution header pipe 64 having a plurality of spray nozzles 66 formed therein to evenly distribute the liquid over the tube sheet 22'.

The conversion of evaporator 10 to a falling film evaporator 10' is completed by closing off or eliminating product outlet 38 and providing a product outlet 68 in communication with a lower portion of bottom chamber 14'. Also a drain conduit 70 is provided in communication with a lower portion of section 30' to remove liquid which collects therein.

Additional features of the invention will become apparent from the following discussion of the operation of evaporator 10'. Feed liquid to be treated is directed into flash chamber 42 through feed inlet 28'. The feed liquid entering chamber 42 is caused to contact the falling liquid and vapor from tubes 20' whereby a portion of the entering liquid is caused to immediately vaporize. The vapor rises in chamber 42 and is directed through vapor riser conduit 44 into vapor separation chamber 18'. The vapor entering chamber 42 is directed horizontally across a lower portion of section 32' so as to utilize the maximum area of section 32' and thereby limit the reentrainment of liquid droplets into the rising vapor. The unvaporized feed liquid from chamber 42 is directed downwardly into bottom chamber 14' along with the liquid leaving the lower ends of tubes 20. The vapor rises in section 32' through entrainment separator 36' into section 34' and is removed therefrom through vapor outlet 40'. Any liquid which forms in chamber 18' descends into section 30' and is removed therefrom through outlet 70.

The liquid which is collected in bottom chamber 14' is directed therefrom through recirculation conduit 54 into header pipe 64 positioned in distribution chamber 62. The recirculated liquid is evenly distributed over top tube sheet 22 via spray nozzles 66 and is directed downwardly through heat exchange tubes 20' as a falling film. The falling film of liquid descending through tubes 20' is heated and caused to vaporize by the steam which is directed into heat exchanger chamber 16' through inlet 26'. The vapor and any unevaporized liquid exits the lower ends of tubes 20' and is directed into flash chamber 42. The product liquid is directed from bottom chamber 14' through product outlet 68.

As one skilled in the art will readily appreciate, suitable controls are necessary to control the flow rates through the various conduits and outlets of the system to maximize the operating efficiency of the system dependent upon the properties of the liquid to be treated. In order to maximize such operation, the present invention contemplates that it may be desirable to incorporate a plurality of vapor riser conduits 44 and recirculation conduits 54.

As will be appreciated from the above description, the present invention provides a method and apparatus for converting an existing long tube vertical evaporator apparatus into a falling film evaporator apparatus in a manner which permits salvaging a large portion of the existing structure. Further, in accordance with the present invention, it is not necessary to alter the heat exchanger chamber and the heat exchange tube supported therein. In so doing, it is not necessary to decrease the heat exchange surface area of the heat exchange tubes or to perform difficult fabrication procedures either within the heat exchanger chamber or to the upper and lower tube sheets.

While the present invention has been described with reference to particular embodiments, it is not intended to illustrate or describe all of the equivalent forms or ramifications thereof. Also the words used are words of description rather than limitation, and various changes may be made without departing from the spirit or scope of the invention disclosed herein. It is intended that the appended claims cover all such changes as fall within the true spirit and scope of the invention.

What is claimed is:

1. A method of converting a long tube vertical evaporator apparatus to a falling film evaporator apparatus wherein said long tube vertical evaporator apparatus includes a heat exchanger chamber having a plurality of heat exchange tubes positioned therein vertically extending between an upper tube sheet and a lower tube sheet, said heat exchanger chamber having a vapor inlet for directing vapor thereinto; a bottom chamber extending below said heat exchanger chamber in fluid communication with the lower ends of said heat exchange tubes, said bottom chamber having a feed inlet for directing feed liquid thereinto and upwardly through said heat exchange tube; and a vapor separation chamber positioned around and above an upper portion of said heat exchanger chamber in fluid communication with the upper ends of said heat exchange tubes, said vapor separation chamber having a vapor outlet at an upper portion thereof and a product outlet at a lower portion thereof; comprising the steps of:
    (a) extending said bottom chamber so as to define a flash chamber intermediate said bottom chamber and said heat exchanger chamber and repositioning said feed inlet to feed liquid directly into said flash chamber into contact with falling liquid and vapor from the heat exchange tubes;
    (b) establishing a pathway for directing vapor formed in said flash chamber into said vapor separation chamber through a vapor riser conduit having a first end connected to said flash chamber and a second end connected to said vapor separation chamber;
    (c) establishing a pathway for recirculating liquid from said bottom chamber through a recirculation conduit having a first end connected to said bottom chamber and a second end connected to an upper portion of heat exchanger chamber and distributing same over the upper ends of said heat exchange tubes; and
    (d) closing off said product outlet at said vapor separation chamber and establishing a product outlet in communication with said bottom chamber.

2. The method as defined in claim 1 further including the step of disposing spray nozzle means in an upper portion of said heat exchanger chamber for receiving liquid from the second end of said recirculation conduit and distributing same above said upper tube sheet.

3. The method as defined in claim 1 further including the step of establishing a liquid distribution chamber above said upper tube sheet within said vapor separation chamber communicates with the second end of said recirculation conduit.

4. In an evaporator apparatus including a heat exchanger chamber having a plurality of heat exchange tubes positioned therein which extend vertically between an upper tube sheet and a lower tube sheet, said heat exchanger chamber having a vapor inlet for directing vapor therein; and a vapor separation chamber positioned above said heat exchange chamber, said vapor separation chamber having a vapor outlet at an upper portion thereof; the improvement comprising: a flash chamber positioned directly below said lower tube sheet in fluid communication with said heat exchange tubes, said flash chamber having a feed inlet for directing feed liquid thereinto; a bottom chamber positioned below said flash chamber in fluid communication therewith; a vapor riser conduit positioned externally of said heat exchanger chamber having a first end in fluid communication with said flash chamber and a second end in fluid communication with said vapor separation chamber for directing vapor formed in said flash chamber therethrough and into said vapor separation chamber; and a recirculation conduit positioned externally of said heat exchanger chamber having a first end in fluid communication with said bottom chamber and a second end in fluid communication with a distribution chamber positioned directly above said upper tube sheet in fluid communication with said heat exchange tubes, said recirculation conduit having recirculation means for circulating liquid from said bottom chamber therethrough into said distribution chamber and downwardly through said heat exchange tubes.

5. The apparatus as defined in claim 4 further including spray nozzle means connected with said second end of said recirculation conduit for distributing the liquid into said distribution chamber.

6. The apparatus as defined in claim 4 wherein said recirculation means is a recirculation pump interposed in said recirculation conduit.

7. The invention as defined in claim 4 wherein said second end of said vapor riser conduit is horizontally disposed so as to direct the vapor passing therethrough horizontally across a lower portion of said vapor separation chamber.

8. The apparatus as defined in claim 4 wherein said first end of said vapor riser conduit communicates with said flash chamber through an opening formed in an outer wall thereof and said second end of said vapor riser conduit communicates with said vapor separation chamber through an opening formed in an outer wall thereof.

9. The apparatus as defined in claim 4 wherein said vapor separation chamber has a lower portion which extends around an upper portion of said heat exchanger chamber.

10. The apparatus as defined in claim 4 wherein said vapor separation chamber has an upper portion having an entrainment separator positioned therein.

* * * * *